United States Patent [19]
Pomatto

[11] Patent Number: 5,179,376
[45] Date of Patent: Jan. 12, 1993

[54] SUBSTATION LOAD DISTRIBUTION MONITOR SYSTEM

[75] Inventor: Lawrence A. Pomatto, Santa Ana, Calif.

[73] Assignee: Systems Analysis and Integration, Inc., Orange, Calif.

[21] Appl. No.: 663,104

[22] Filed: Feb. 28, 1991

[51] Int. Cl.⁵ .................................. H04B 9/00
[52] U.S. Cl. ................... 340/870.02; 340/310 A; 364/483
[58] Field of Search ......... 340/870.02, 310 A, 870.05; 324/83 R, 83 D, 85, 126, 127; 361/30, 35, 79-81; 364/571.02, 178, 483

[56] References Cited

U.S. PATENT DOCUMENTS

| | | | |
|---|---|---|---|
| 4,315,251 | 2/1982 | Robinson et al. | 340/310 A |
| 4,359,644 | 11/1982 | Foord | 307/40 |
| 4,396,915 | 8/1983 | Farnsworth | 340/870.03 |
| 4,672,555 | 6/1987 | Hart et al. | 364/483 |
| 4,745,512 | 5/1988 | Hampson | 361/36 |
| 4,847,780 | 6/1989 | Gilker et al. | 324/127 |
| 5,006,846 | 4/1991 | Granville et al. | 324/126 |

OTHER PUBLICATIONS

F. W. Bell, *High Frequency Current Sensor, Model IH-150* (probably published in 1987).
AEMC Instruments, *AC Current Probe Model JM810*, Cat. #1201.06, Jul. 1988.
AEMC Corporation, *Clip-On Current Transformer 1000/1*, Feb. 1983.

Primary Examiner—Donald J. Yusko
Assistant Examiner—Michael Krakovsky
Attorney, Agent, or Firm—Knobbe, Martens, Olson & Bear

[57] ABSTRACT

The monitoring and control system of the present invention provides a distributed intelligence, data acquisition and control system which collects and analyzes large amounts of data representing power usage from a power distribution substation. The system also provides the capability of various control functions for the substation. The system provides communications capabilities between local devices and also with a remote computer. The system provides real time monitoring of power usage and real time control of various functions in the substation.

18 Claims, 8 Drawing Sheets

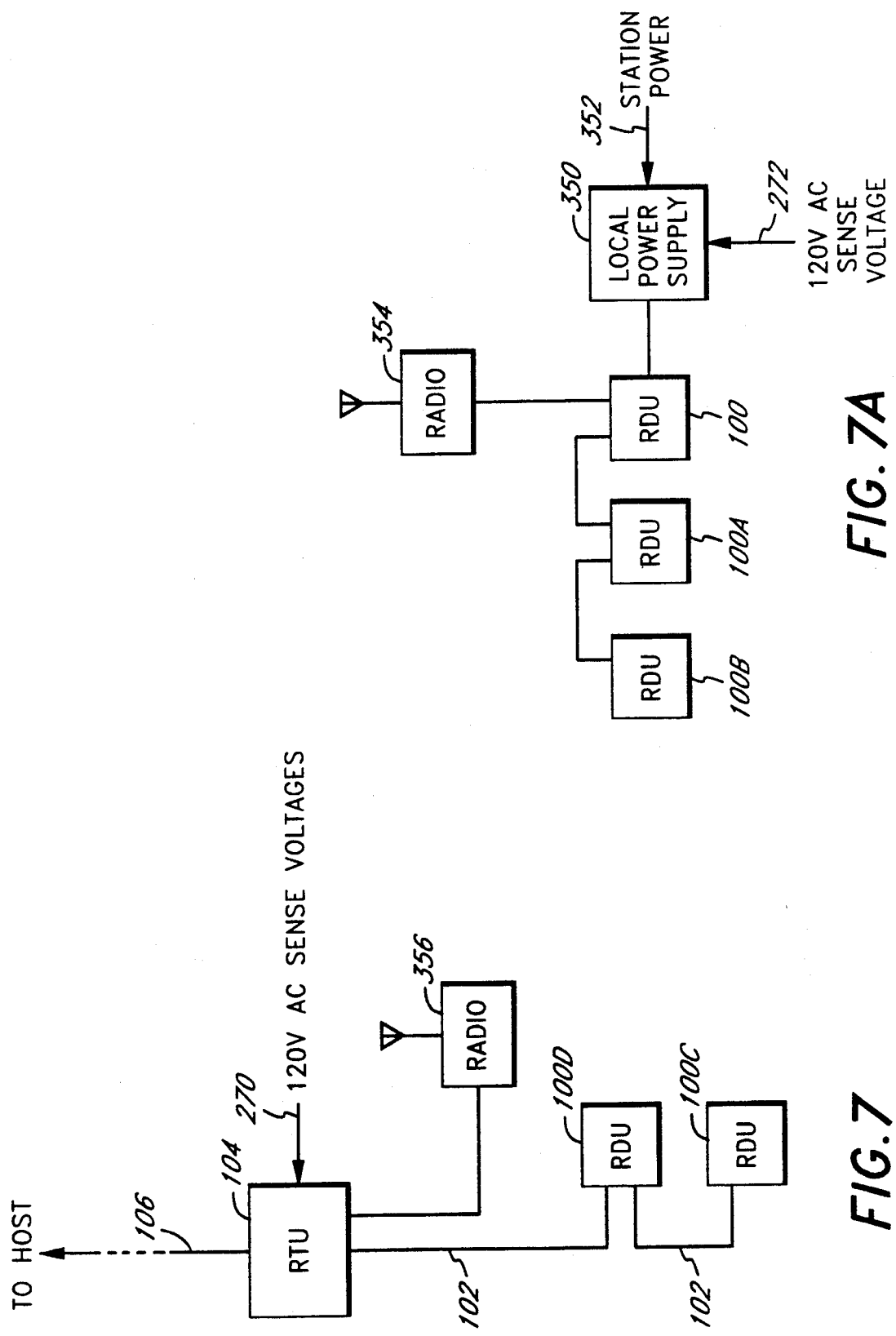

SUBSTATION LOAD DISTRIBUTION MONITOR SYSTEM

BACKGROUND OF THE INVENTION

1. Field of the Invention

The present invention relates to improvements in monitoring and controlling substation power distribution. Specifically, the invention involves a method and apparatus for automatically monitoring substation power distribution and usage and transmitting the information to a remote location in order to provide real time, improved-accuracy monitoring of consumer loads and to control a remote power distribution substation from a remote location.

2. Description of the Related Art

At each power substation, there are generally transmission and distribution circuits, transformers, circuit breakers, capacitor banks, and other electrical equipment (hereinafter "power equipment") which deliver electrical power. The various pieces of electrical equipment, including the circuits and transformers, are protected for overload and fault conditions by monitoring the current in each phase of the equipment. The normal method of monitoring this current is by using a current transformer. A current transformer transforms the primary current (normally in the range of 100 to 3000 amps) to a secondary current in the range of 5 amps. The secondary current is then monitored via protection equipment, and upon detection of an overload or fault, the protection equipment will trip (open) the appropriate breakers to terminate the fault.

Because the current transformer has a known primary to secondary ratio, the current transformer can also be considered as a current sensor. This current sensor is used via a transducer in many substations to provide a DC signal which is representative of the primary current. In most applications today, the transducer is installed by inserting it in series with the secondary of each current transformer which is to be monitored.

Another possibility for monitoring the secondary current is to pass the secondary lead of the current transformer through a solid core current transformer, and measuring the output of the solid core transformer.

If the substation is being retrofitted for collection of this current data, the secondary lead of the current transformer must be cut and wired through the transducer, or at least disconnected and passed through a solid core current transformer.

Even though the secondary lead of the protection circuit current transformer only carries approximately 5 amps, if this wire is severed, the voltage across the open ends will increase to whatever voltage is necessary to provide a current in the secondary lead of the current transformer corresponding to the current flowing in the primary side of the current transformer. This voltage could become very high, creating a dangerous condition, including developing an arc within the current transformer. Therefore, in order to install a transducer in the current transformer secondary wire safely, the entire substation, or a portion of the substation, is de-energized so that the current transformer secondary wire may be cut and the transducer installed without serious danger.

This process is very time consuming and expensive. For instance, if a substation had ten circuits, each with three phases, it would take approximately 40 man hours to install the transducers in all of the protection circuit lines.

Moreover, in order to repair the transducer, it is often necessary to shut down the substation, or at least a portion of the substation.

Another disadvantage to present systems is that the meters connected to the transducers are located at the substations. Therefore, in order to monitor the power usage through the substation, a person reads the meters and records the measurements. This does not provide real time information. Thus, this type of monitoring generally results in providing more power through a station to handle the maximum expected load than is absolutely necessary.

Systems, such as those disclosed in U.S. Pat. Nos. 4,396,915 and 4,315,251, disclose automatic meter reading and control systems. The systems disclosed automatically read meters at the point of use by individual consumers and transmit the data to central location. These systems, if applied to the power substation contexts, would provide real time data; however, these systems would not solve the problem of cutting into the protection circuit at a substation to install the transducers which operate the meters.

SUMMARY OF THE INVENTION

Applicant recognized that this conventional method of monitoring could be improved and that it would be advantageous if installation of a monitoring system did not require de-energizing the electrical equipment associated with the primary of the current transformer.

Applicant also recognized that if these substations were monitored efficiently in real time with accurate information transmitted to a central location, then the utility company could more efficiently use existing substations to their capacity and thereby reduce the number of substations required for power distribution.

Therefore, the present invention involves a distributed data acquisition and control system to meet the functional requirements of power distribution system substation monitoring and control. In particular, the invention involves collecting and analyzing power transmission and distribution data representative of power usage at a substation and providing this data to a remotely located office. The system, in summary, provides data including the line voltage, line current, watts, volt amperes reactive (VARs), power factor (PF) and other important parameters as further explained herein. The applicant recognized that this monitoring could be accomplished efficiently without cutting into the protection circuit, or taking the substation off-line. The present invention thus simplifies installation and minimizes the cost, yet provides accurate information.

The information collected using the present invention is transmitted to the utility company's remote office, in one embodiment, for real time data monitoring of power usage through the substation.

One aspect of the present invention involves a power monitoring system for use in power distribution substations with power equipment carrying voltage and current to distribute electrical power. The power equipment generally has an associated protection circuit with a current flowing which is stepped down from, but proportionally corresponds to, the current flowing through the power equipment. The system comprises at least one system controller, wherein the system controller is a microprocessor based controller with a respective power converter which steps down the voltages on the power equipment. The system further comprises at least one data acquisition unit in communication with the system controller, wherein the data unit comprises a microprocessor based controller, an analog to digital converter and a memory. Additionally, the system comprises at least one clamp-on, split-core current transformer detachably mounted on one leg of the protection circuit, and the current transformer provides current, stepped down from, but proportional to, the instantaneous current flowing in the power equipment. Moreover, the current provided by the current transformer is converted by the analog to digital converter into digital form for further processing by the data unit and the system controller.

In one embodiment, the system controller communicates with a remote computer over a communications link.

Another aspect of the present invention involves a method of monitoring power equipment carrying a voltage and a current, wherein the power equipment also has associated protection circuits carrying a current which is stepped down from, but proportional to, the current flowing in the power equipment. In summary, this aspect of the present invention involves providing at least one system controller, providing at least one data acquisition controller in communication with the system controller, stepping down the voltage in the power equipment, and detachably mounting a split-core current transformer on one leg of the protection circuit. The split-core current transformer provides a current, stepped down from, but proportional to, the current flowing in the power equipment. A representation of the current provided by the current transformer is sampled and converted into digital form for further processing by the system controller and the data acquisition unit. The stepped-down power equipment voltage is also sampled and converted into digital form. The relative phase angle between the sampled current and the sampled voltages, the power, the power factor and volt amperes distributed by the power equipment are then calculated. Finally, the calculations are transmitted to a remote computer.

This system provides numerous advantages over existing systems. As previously explained, to install or repair conventional monitoring systems without serious danger, all or a portion of the substation is de-energized. In the present invention, a split-core current transformer is simply clamped onto the secondary lead of the protection circuit, and the resulting current from the split-core transformer is very low (in the milliamp range). Therefore, installation is very quick and easy. The simple installation results in substantial cost savings when compared to installation of conventional monitor and control systems for substations.

Moreover, even though split-core transformers are often used to monitor current, the present invention provides a system which is highly accurate from sample to sample, even though the monitored current is stepped down from an initially high value (100 to 3000 amps) to the milliamp range. Thus, the utility company receives data which accurately represents the power usage through the power equipment at the substation.

Finally, the present invention also provides a system in which repairs are easy. Not only can the split-core transformer be easily removed or replaced without cutting into the protection circuit, data acquisition units which sample the stepped down voltage and current in the substation are daisy chained together. Thus, if a data acquisition unit needs repair, it can be removed from service by simply disconnecting it from the daisy-chain. The daisy-chain is then connected together without the data acquisition unit which needs service. The remainder of the system continues to function as normal.

BRIEF DESCRIPTION OF THE DRAWINGS

FIG. 7 and FIG. 7A are block diagrams showing an embodiment with RDUs operating remote to the main RDU/RTU combinational system.

DETAILED DESCRIPTION OF THE PREFERRED EMBODIMENT

Figure 1:
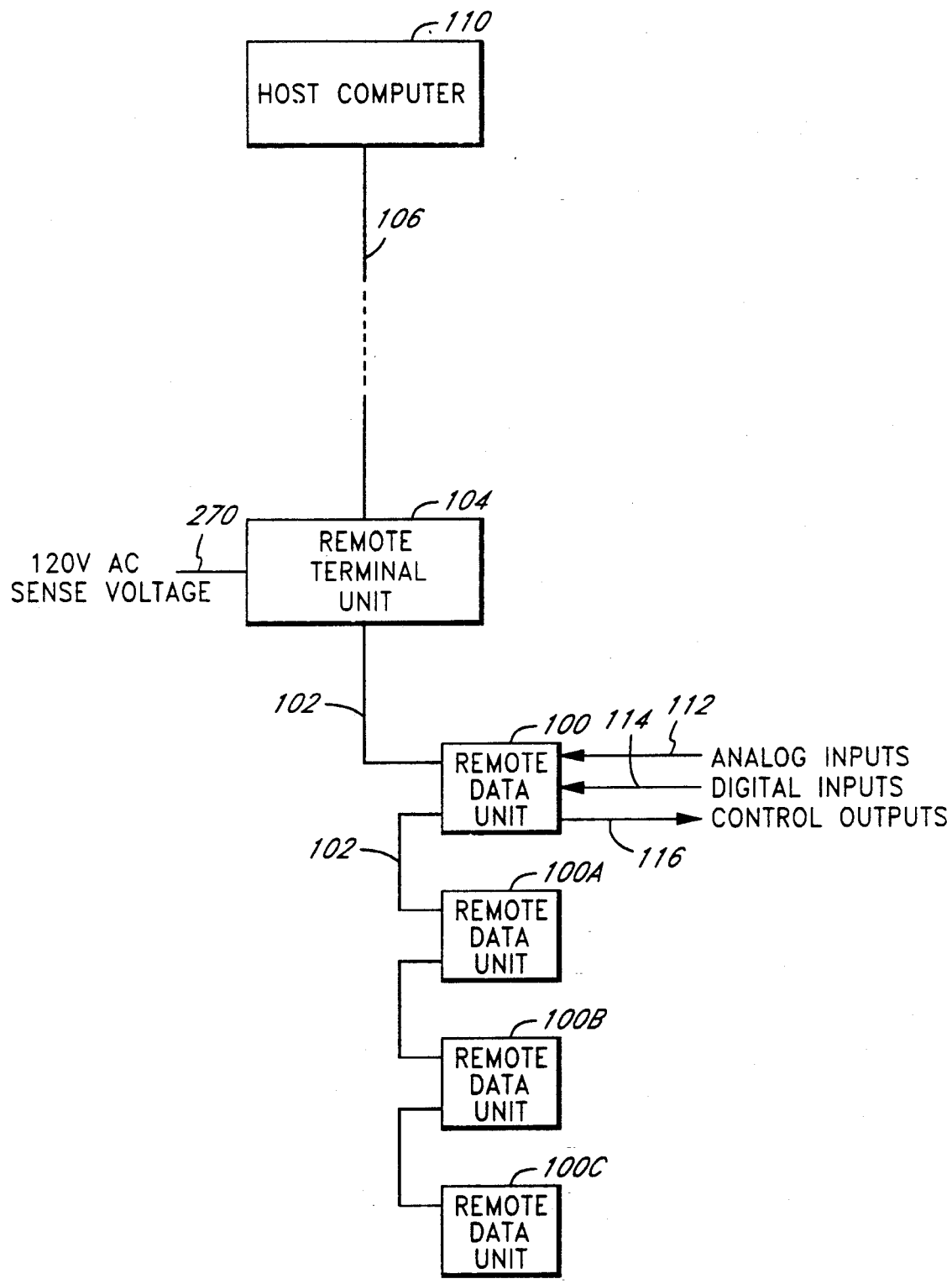
FIG. 1 is a block diagram of the power monitoring system of the present invention.

FIG. 1 depicts the overall system block diagram of the present invention. The system comprises, a plurality of remote data units (RDUs) 100, 100A, 100B, 100C, which are chained together with a daisy chain cable 102 which connects the remote data units to a remote terminal unit (RTU) 104. The four RDUs 100-100C are simply shown for illustration purposes. The system may comprise more or fewer RDUs. In the present embodiment, the RTU 104 communicates with a remote computer such as the host computer 110 over a communications link 106. The communications link 106 may comprise any communications system such as a radio communications link, a modem/telephone line link, a fiber optic link or any other communications link.

The Remote Data Units

Figure 2:
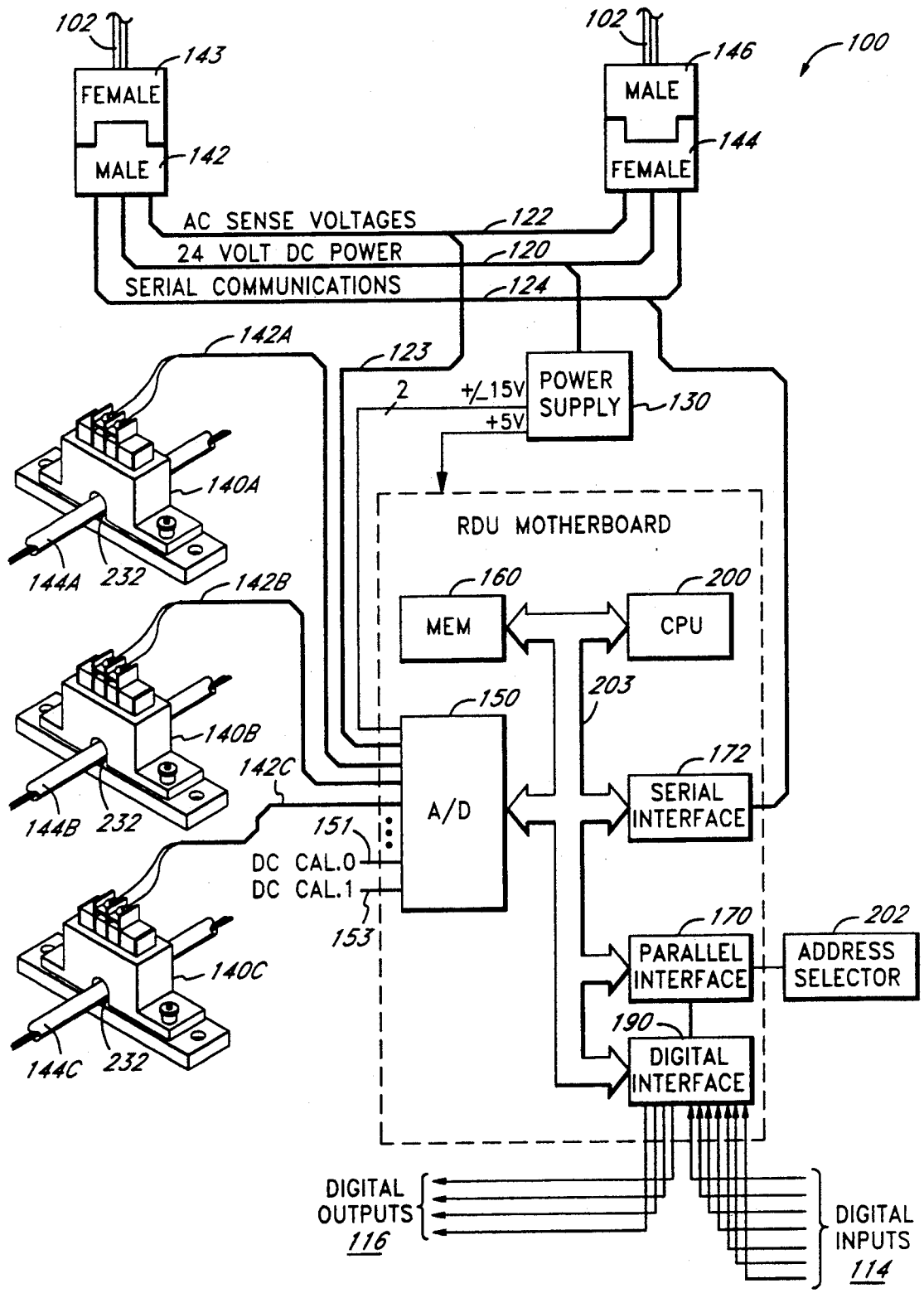
FIG. 2 is a functional block diagram of an exemplary remote data unit (RDU).

A functional block diagram of an individual remote data unit (RDU) 100 is shown in FIG. 2. Further references to RDU(s) 100 includes any of the RDUs 100-100C. The RDU comprises a microprocessor based controller with control and data acquisition capabilities. The RDU 100 samples scaled down analog voltage and current signals proportionally corresponding to values in power equipment, and determines values for the power factor, watts, volt amperes reactive (vars), voltage and amperes for the respective power equipment.

The RDU 100 shown in FIG. 2 illustrates the structure for each of the RDUs 100, 100A, 100B, and 100C of FIG. 1. The RDU 100 comprises a power supply 130, which provides +5 and +/−15 volts DC for other elements in the RDU 100, a multi-channel analog to digital (A/D) converter 150, a memory 160, a serial interface 172 and a parallel interface 170. A microprocessor based central processing unit (CPU) 200 provides control for the RDU 100, and a digital input/output (I/O) interface 190 provides further monitoring and control capabilities for the substation on the digital input lines 114 and the digital output lines 116. Split-core, clamp-on current transformers (CTs) 140A, 140B, 140C, provide analog current sense signals on lines 142A, 142B, 142C to the A-D converter 150. Further references to CT(s) 140 includes any of the CTs 100A-140C in the system. An RDU address selector 202 comprising an eight-position dual-in-line package (DIP) switch connected to the parallel interface 170 indicates the address of the RDU 100 within the daisy-chained RDUs 100, 100A, 100B, and 100C (FIG. 1). The DIP switch address selector 202 also provides further configuration information for the RDU 100 as described herein.

The daisy chain cable 102 advantageously comprises an 18-twisted pair cable with overall shield rated at 600 volts. The daisy chain cable 102 carries signals for the RDUs 100–100C on a 24-volt DC power input source signal lines 120, low voltage (e.g., six volts) AC sense signals from the RTU 104 on signal lines 122, (advantageously, the RTU 104 transforms the power equipment voltages to stepped-down sense signals representative of the AC line voltage), and serial communications interface signal lines 124 for communications over, advantageously, a conventional RS-485 multidrop link. The daisy chain cable 102 is connected to each RDU 100 via a quick disconnect female connector 143 and leaves the RDU 100 via a similar male connector 146. The RDU has corresponding male and female connectors 142 and 144. Advantageously, these connectors comprise D-subminiature, 37-pin male and female connectors available from Cinch Corp. of Oak Grove Village, Ill. This daisy chain approach allows each individual RDU 100 to be removed from service for testing or repair without impacting on the operation of the remainder of the system or the pow]r substation. Each RDU 100 can be removed by simply powering down the control system and disconnecting the male and female connectors 146 and 143 respectively from the RDU 100 and reconnecting the respective female and male connectors 143 and 146 without the RDU 100 which has been removed.

The 24-volt DC power from the RTU 104 on line 120 serves as a power source for he power supply 130 which comprises conventional +/−15 volt and +5 volt power supplies. The power supply 130 distributes power throughout the RDU 100. A number of AC sense signals also enter the RDU 100 on signal lines 122. For instance, if there is one three-phase power transmission or distribution line in the substation, then the signal lines 122 carry three low voltage AC sense signals, one corresponding to each phase of the power equipment.

Advantageously, all of the power and voltage sense signals are metal oxide varistor (MOV) protected.

The A/D converter 150 accepts analog inputs from multiple channels. In the present embodiment, the A/D converter 150 accepts inputs from sixteen-channels. The low voltage sense signals from the RTU 100 enter the A/D converter 150 via signal lines 122. The A/D converter 150 converts the sense signals to digital form upon request by the CPU 200. The digitized values are read by the CPU 200 via a conventional data bus 203 connecting the A/D converter 150 to the CPU 200. An INTEL 80C88 microprocessor controls the CPU 200 operations. The CPU 200 also includes a real time clock (not shown). In the present embodiment, the memory 160, connected to the CPU 200 via the conventional data bus 203, comprises 16K bytes of EPROM (erasable programmable read only memory), and up to 256K bytes of CMOS (complementary metal oxide semiconductor) static memory. A CPU clock (not shown) generates 100 millisecond interrupts for the CPU 200. These components are well understood in the art.

Each RDU 100, although structurally identical, is unique in the daisy chain after it is configured with an associated address. The DIP switch 202 address is configured by setting five of the switches to represent a five-bit address for the corresponding RDU 100. The address selector 202, is read by the CPU 200 from the parallel interface 170. The CPU 200 stores this five-bit address in the CMOS static memory.

Figures 3, 3A:
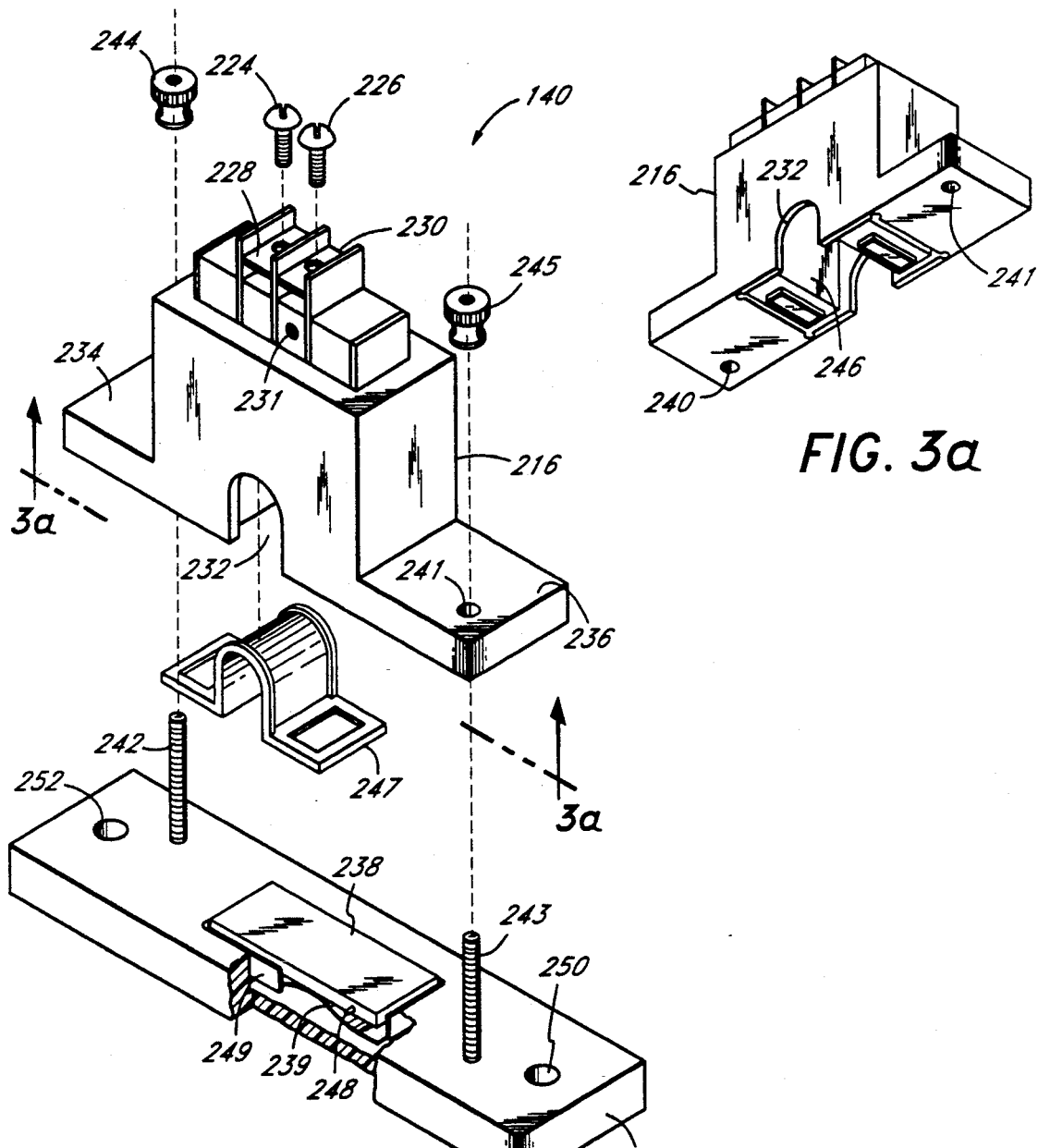
FIGS. 3 and 3a depict a clamp-on current transformer.
Figure 4:
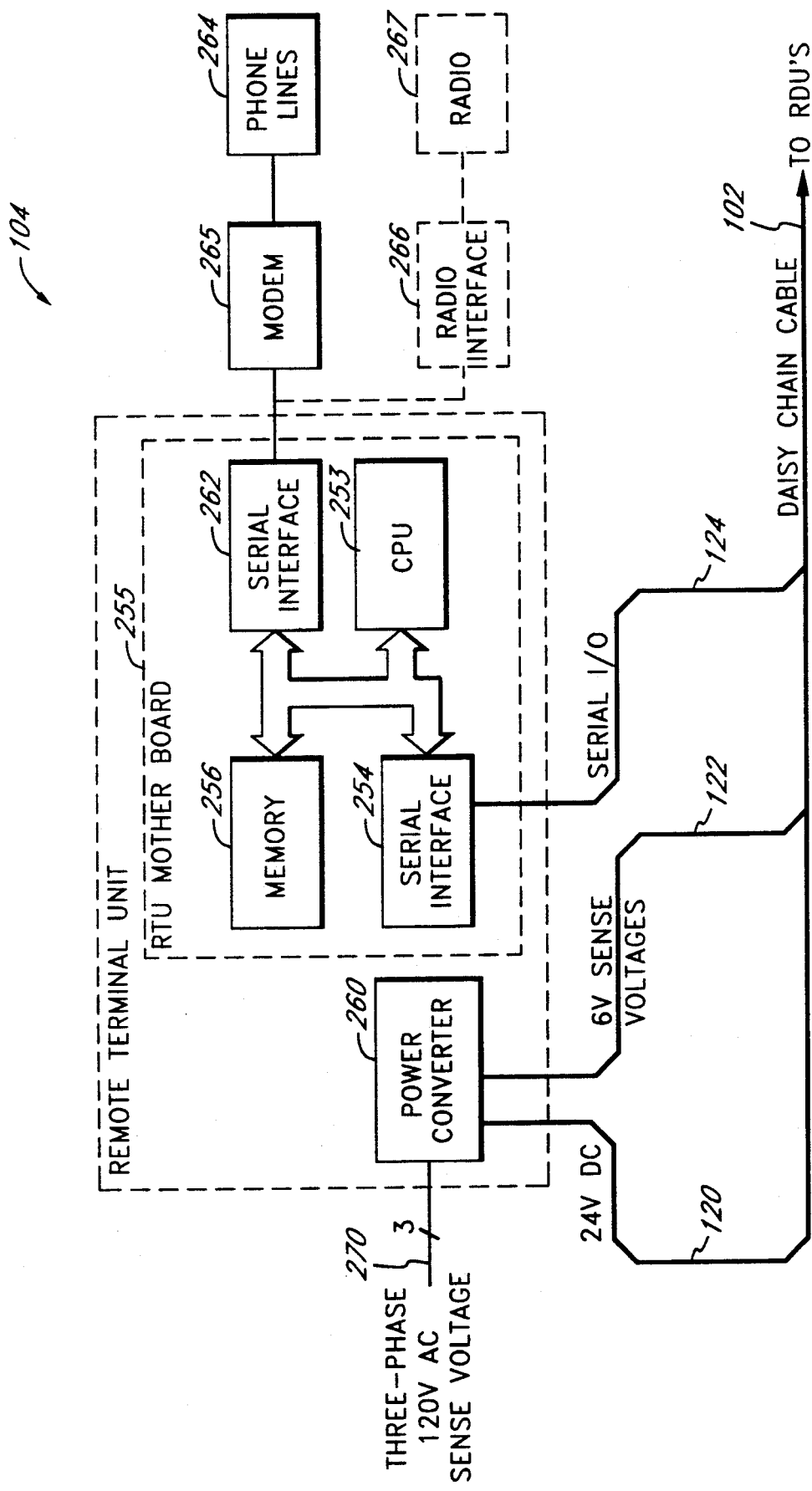
FIG. 4 is a block diagram of an exemplary substation remote terminal unit (RTU).

The clamp-on CTs 140, as depicted in FIG. 3 and 3a, comprise a housing constructed of plastic or other composite material, and a split-core current transformer within the housing. Advantageously, the housing is generally rectangular in shape and approximately 1.2 inches wide, 1.5 inches high and about 3.5 inches long. The housing has a detachable base plate 214, a main body portion 216, and two connectors depicted in this embodiment as screws 224, 226 each with corresponding pressure plates 228 and 230. One of the connectors is marked with a polarity marking 231 which indicates the positive terminal of the CT 140. The main body portion 216 is approximately 2.5 inches long, 1.4 inches high, and 1.2 inches wide. At the base of the main body portion, two extending portions 234 and 236 provide a base-plate mounting surface.

These extending portions 234 and 236 extend from the base of the main body portion 216 such that the overall length of the main body portion 216 plus the extending portions 234 and 236 is approximately 3.5 inches. Each extending portion 234 236 has an aperture 240 and 241 adapted to receive screws 242 and 243, respectively which are preferably positioned through the base plate 214. Each of the screws 242 and 243 has a corresponding thumb nut 244 and 245 respectively.

Each main body portion 216 also has semi-circular channel 232 defined at the base, and extending across the width, of the main body portion 216. As seen in FIG. 3a, the main body portion 216 houses the secondary side of a split-core current transformer 246 with a dynamic range of 0–10 amps and an overall repeatable accuracy of better than 1% over the operating range in the present invention. The channel 232 is formed about the core of the secondary of the current transformer. Advantageously, when operational, the split-core current transformer steps down the current by a factor ranging from approximately 10,000:1 to 2,000:1. Other scaling factors are also suitable depending upon the signals desired from the CTs for particular applications. Advantageously, the current is stepped down sufficiently in the split-core transformer 246 so as keep the current low enough to avoid overloading the protection circuit current transformer. However, even when the current is stepped down into the 0–0.5 mA operating range for the output of the split-core current transformer, the 1% repeatable accuracy is maintained.

A cover 247 is placed within the main body portion to protect the transformer 246 as depicted in FIG. 3.

The detachable base plate 214 is planar and is detachably mounted to the base of the main body portion 216. Advantageously, the detachable base plate is approximately 5 inches long, 0.375 inches thick, and 1.2 inches wide. The base plate 214 has, advantageously, a planar conductive plate 238 embedded within and along the detachable base plate 214 in a cavity in the base plate 214 adapted to receive the conductive plate 238. In a preferred embodiment, the conductive plate 238 is mounted with a spring 239 positioned in the cavity in the base plate 214 between the conductive plate 238 and the base plate 214 The conductive plate 238 is held in place with pins 248 which pass through the conductive plate 238 at each end of the conductive plate 238. In the preferred embodiment, the face of conductive plate protrudes above the surface of the base plate 214 when the base plate is not attached to the main body portion 216. With this configuration, the conductive plate maintains a snug fit to complete the split-core transformer 246 when the base plate 214 is attached to the main body portion 216 of the housing. Moreover, in a preferred embodiment, an insulating layer 249 of non-conductive material is positioned around the edge of the conductive plate 238 within the cavity in the base plate 214. When the base plate 214 is attached to the main body 216 of the housing, the conductive plate 238 completes the core of the split-core current transformer 140. The base plate 214 also has apertures which may be threaded and adapted to receive the screws 242 and 243 respectively to attach the base plate 214 to the main body portion 216. When the base plate 214 is attached to the main body portion 216, it extends beyond each extending portion 234, 236 so that the base plate 214 can be independently attached to a mounting surface by the use of the apertures 250 and 252.

Advantageously, the current sense signals from the CTs 140A-140C are protected with a back-to-back diode configuration well understood in the art. For instance, in a preferred embodiment, a conventional transient overvoltage suppressor (not shown), such as a Motorola IN6386 Zener Overvoltage Transient Suppressor, is positioned within the housing 214 and connected between the two connectors.

A wire passing through the aperture 232 functions as the primary for the current transformer when the base plate 214 is attached to the main body portion 216. Exemplary split-core current transformers suitable for use within the housing are manufactured by AEMC Instruments corp., Boston, Mass. (CT parts kit #1031.03).

As described, the clamp-on CTs 140A-C are small and are very accurate even though the output currents advantageously range from 0-0.5 mA in the present embodiment.

As briefly explained above, at each power substation there is generally power equipment which delivers electrical power. The various types of power equipment are usually protected for overload and fault conditions by monitoring the current in the equipment. A typical method of monitoring this current is with a current transformer which steps down the current in the primary (normally in the range of 100 to 3000 amps) to a secondary current in the range of 5 amps. The secondary current is monitored with protection equipment, usually involving transducers installed in one leg of the secondary of the protection circuit current transformer. This generally requires cutting into one leg of the secondary of the protection circuit if the substation is being retrofitted. Although this process is time consuming as explained above, it continues to be the conventional method for substation monitoring of high-power, power equipment. Applicant recognized hat this method could be greatly simplified.

The clamp-on CTs 140 described connect easily to one leg of the secondary side of the protection circuit current transformer connected to each phase of the power equipment. To attach the clamp-on CT 140, an installer removes the detachable base plate 214, positions one leg 144A, 144B or 144C (FIG. 2) of the protection circuit within the channel 232, and re-attaches the detachable base plate 214. The substation need not be taken off-line and the protection circuit need not be cut. This allows for quick, safe, and efficient installation and repairs. Therefore, the transducers of conventional monitoring systems need not be installed in the secondary of the protection circuit. Accordingly, installation of the clamp-on CTs 140 of the present invention substantially improves upon the more difficult, time consuming, and dangerous installation of the transducers used in conventional systems. Moreover, even though the CTs 140 are split-core devices which monitor current flowing in a conductor without cutting into the wire, and even though the CTs step down the current detected significantly (e.g. to the 0-0.5 mA operating range in the present embodiment), the Applicant designed the present invention to provide accurate information about the power flow through the power equipment. This manner in which the accuracy is maintained is further explained herein.

Once the CTs 140A-C are installed, the legs 144A-C of the protection circuit passing through the aperture 232 function as the primary for the CTs 140A-C. Thus, a current, scaled down (by a factor of 10,000 in the present embodiment) corresponding to current detected in the protection circuit is provided to the secondary of the transformer via the connectors of the CTs.

A detectable voltage is provided by connecting a resistance (e.g. effectively 2 ohms in the present embodiment) in series with the secondary of the clamp-on CTs 140A-C (e.g. attaching a resistor between the two connectors). Upon installation, the analog voltage signals from the CTs 140A-C are calibrated by using a potentiometer (not shown) to maintain the 1% repeatable accuracy in the system. The analog voltage signals from the clamp-on CTs 140A-C are provided to the A/D converter 150 which converts the voltages into digital form upon request from the CPU 200. The CPU 200 reads the digitized signals from the conventional data bus 203 as previously explained. Because the resistance across the clamp on CT 140A-C is known, the current corresponding to the measured voltage is calculated as well understood in the art.

The RTU

The remote terminal unit (RTU) 104 functions as the system controller in the present embodiment and performs the following primary functions: poll the RDUs 100 for data, transform the AC power equipment voltages to low voltage AC sense voltages, communicate with a remote computer such as the host computer 110 and provide the remote computer with the data obtained from the RDUs 100 upon request.

Advantageously, the RTU is based around a computer motherboard 255. The RTU 104 hardware comprises a microprocessor based (i.e. an INTEL 80C88) motherboard 255 with a CPU 253, real time clock (not shown), serial communications channels each with a dedicated serial interface 254, 262, a memory module 256, and a conventional step-down power converter 260. In the present embodiment, the motherboard 255 advantageously comprises a conventional C-44 bus 80C88 based controller motherboard as well understood in the art. The serial communications channels utilize appropriate dedicated serial interfaces 254 and 262. One serial interface 254 connects the RTU 104 to the RDUs 100 via a shared conventional RS-485 link. The serial interface 262 is used to communicate to either an external modem 265, which in turn connects to telephone lines 264 to communicate with the host 110 as well understood in the art, or to a radio interface 266, which in turn connects to a radio 267 to communicate with the host. An exemplary radio communications link interface advantageously comprises a Metricom Packet Radio Controller which connects to a Metricom transceiver. Those skilled in the art will appreciate that other communications links are also appropriate and do not detract from the subject matter regarded as invention.

In the present embodiment, the memory module 256 advantageously comprises an EPROM, which is used for program execution, and a CMOS static RAM, which is used for configuration storage [nd is well understood in the art.

The step-down power converter 260 converts AC line voltages on signal lines 270, which are usually already stepped down somewhat from either a 4 kilovolt or 16 kilovolt (phase to ground) range of the power equipment, to low voltage (e.g. six-volt) sense voltages. The RTU 104 provides these sense signals on signal lines 122 to the RDUs 100-100C, via the daisy chain cable 102, one pair of wires for each sense voltage. The power converter also provides the 24-volt DC power for the RDUs 100 on signal lines 120 of the daisy chain cable 102.

An A/D converter (not shown) similar to that of the RDU 100 can also be included in the RTU 104 for converting analog data into digital form.

System Firmware

FIG. 5 is a flowchart of operations carried out by each RDU 100. The RTU 104 can also perform many of the same functions, but generally leaves these functions to the RDUs 100-100C. In general, the RDUs 100-100C acquire sample data representing values for voltage and current for a respective power equipment line, analyze the data, and transmit the data to the RTU 104 upon request. The RTU 104 performs primarily the functions of obtaining data from the RDUs 100-100C and for communicating with the remote computer 110.

Configuration

During configuration operations, as represented in action block 280, the RDUs 100 read hard configuration data from the DIP switch address selector 202 connected to a conventional parallel interface 170. The RTU 104 has a similar DIP switch (not shown), connected to a conventional parallel port, for address configuration of the RTU 104. Only five switches from the eight-pin DIP 202 are allocated for address selection. Upon start-up and initialization, the RDU 100 reads the address selected by the five switches connected to the parallel port 170 and stores the address in the CMOS portion of the memory 160 of the RDU 100. The RTU 104 executes the same function with its address selector. Thereafter, during normal operations, the RDUs 100 and the RTU 104 read their corresponding addresses from the memories when a communication request is made to, or a transfer is executed by, these devices. An RDU 100 or RTU 104 will only respond to serial communications requests with addresses that match the selected addresses for that RDU 100.

The other three switches in the eight-switch DIP 202 provide configuration information about the type of power equipment line which is monitored by the RDU 100. For instance three-phase or single phase, clockwise or counterclockwise, and phase-to-neutral or phase-to-phase monitoring.

In the present embodiment, the three switches (switch 8, switch 7, and switch 6) not used for address selection are defined as shown in Table 1 to configure the corresponding RDU 100 for the type of monitoring involved:

TABLE 1

| SWITCH SELECTION | | | | |
|---|---|---|---|---|
| S8 | S7 | S6 | | DESCRIPTION |
| 0 | 0 | 0 | (0) | Undefined (invalid) |
| 0 | 0 | 1 | (1) | 3 phase, CW & CCW, P-N |
| 0 | 1 | 0 | (2) | 3 phase, CW, P-P |
| 0 | 1 | 1 | (3) | 3 phase, CCW, P-P |
| 1 | 0 | 0 | (4) | 1 phase, CW, P-N |
| 1 | 0 | 1 | (5) | 1 phase, CW, P-P |
| 1 | 1 | 0 | (6) | 1 phase, CCW, P-N |
| 1 | 1 | 1 | (7) | 1 phase, CCW, P-P | where:
CW = ABC clockwise; CCW = ABC counterclockwise
P-P = phase-to-phase; P-N = phase-to-neutral The RDU 100 reads and stores the value of these three switches in the CMOS portion of the memory 160, and uses this configuration information during subsequent operations as later explained.

The RDUs 100 also accept optional data downloaded from the RTU 104 and the host 110 to configure the RDUs 100. For instance, the RDUs 100 can receive a unique address from the RTU 104 which the RDU 100 will use instead of the switch-selected address. The RTU 104 may also receive a unique address from the host computer 110 to which it will respond to the exclusion of the switch-selected address of the RTU 104.

The RDU 100 can also receive correction offset values for phase differences computed for each current-voltage pair as explained herein. These offsets correct for system bias or other factors specific to a given RDU 100.

Finally, because the RDU 100 scales all data it collects into engineering units, it receives scaling factors for this operation which are downloaded from the host 110 via the RTU 104. Again, the RDU 100 stores all this configuration information in the CMOS portion of the memory 160 for further reference during subsequent operations.

Data Collection and Analysis by the RDU

Once configuration of the RDUs 100 and the RTU 104 is complete, the RDUs 100 begin data collection and analysis.

In the present embodiment the RDU initiates data collection approximately every three seconds. Data sampling is represented in action block 281 of the flow chart of FIG. 5. During data sampling, the A/D converter 150 samples the low voltage AC sense signals on signal lines 123 and signals from the clamp-on CTs 140A-C at a frequency sufficient to determine the phase angle between the voltage and the current waveforms. The A/D also samples two analog DC reference signals on lines a DC CAL.0 signal line 151 and a DC CAL.1 signal line 153 connected to two channels of the A/D converter 150. In the present embodiment, the A/D converter 150 samples the six-volt sense signals and the voltages from the clamp-on CTs 140A-C at a rate of approximately 2400 times each second, but only samples the waveforms at this rate for 0.25 seconds (15 cycles of 60 Hz voltage and current signals). Moreover, the two channels accepting signals representing the current and voltage sine waves from a respective power equipment line are sampled in tandem. Thus, each channel is only sampled at a rate of approximately 1200 samples per second.

The samples are later corrected for the 1/2400 second delay between the sample points of voltage sine wave and the sample points of the current sine wave. This sampling rate provides sufficient information for the RDU 100 to determine the magnitude of the voltage and the current, and also to calculate the phase angle between the voltage and current in the power equipment.

Analog-to-Digital Data Processing

Typically, the data sampled from the A/D represents real time signals from AC sine waves for current and voltage. Current and voltage sine waves from the same power line are related by the phase relationship between these sine waves. The determination of an accurate phase relationship, as represented in action block 282, involves a number of steps according to the present invention, as further represented in the flow chart of FIG. 5B. The sample data is first transformed to obtain a transformed time scaled sample distribution with samples points spaced at appropriate intervals to represent a whole number of cycles because the raw sample points will not necessarily obtain the precise maximums, minimums, and zero crossings for the sampled sine waves. Then, because any two A/D channels sampled in tandem are not sampled at precisely the same instant, the samples are corrected for the 1/2400 second difference in the sample point. The "absolute phase" of the individual sine waves is next determined. (For purposes of this description, absolute phase of a sampled sine wave is defined as the instantaneous phase at the moment when the very first sample was taken of the wave during any 0.25 second packet of data collection. Finally, the relative phase between two sampled sine waves is determined. This process is further explained below.

Figure 5A:
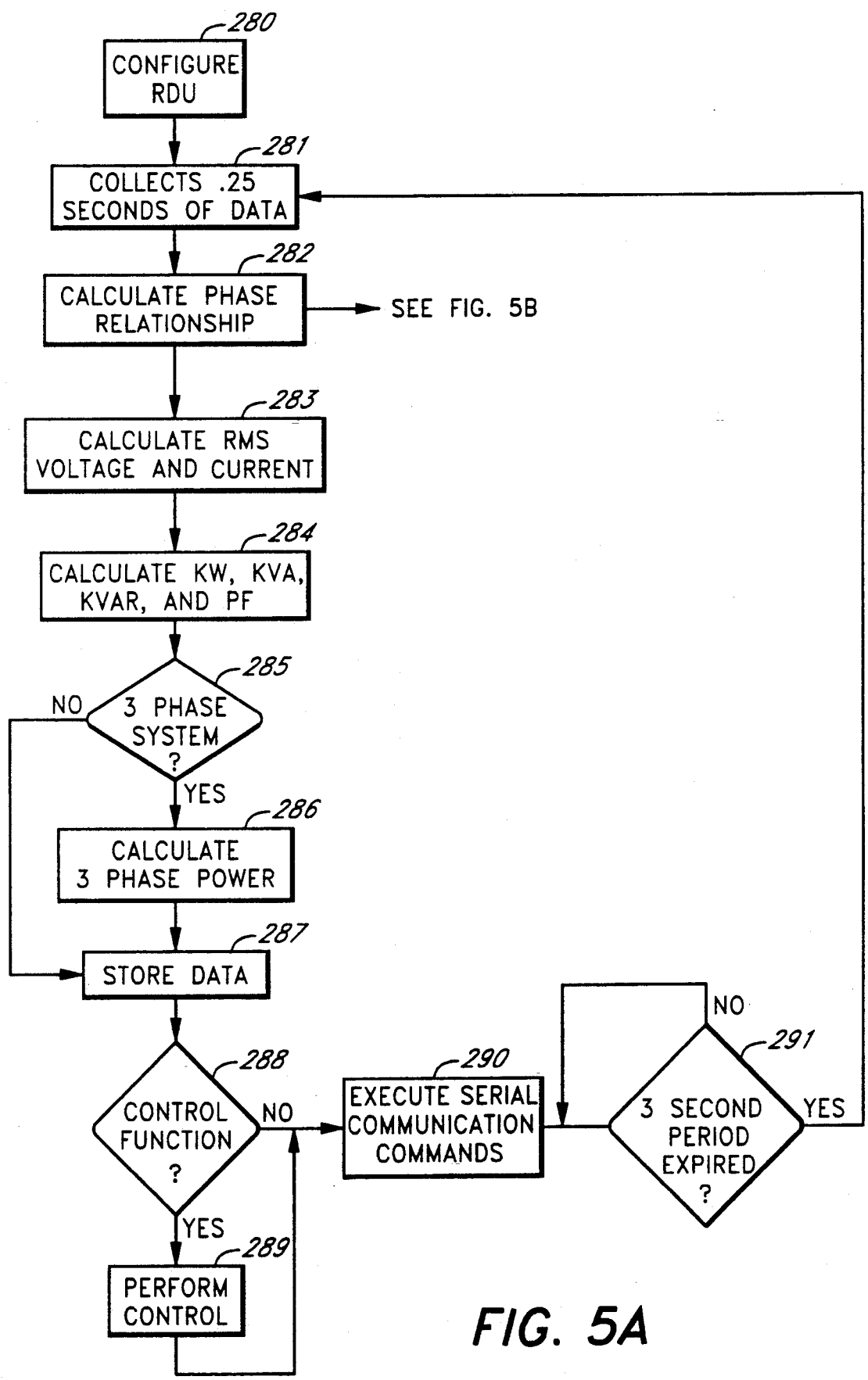
FIG. 5A and FIG. 5B are exemplary flow charts for firmware of the RDU.

In the present embodiment, after collecting 15 cycles of raw data, the RDU 100 transforms this data into transformed sine wave distributions with a number of sample points equal to an integer (I) multiple of the frequency as represented in action block 300 (FIG. 5A). To transform the data, an imaginary clock is defined which ticks at a rate of 100 times for each sample taken from a single channel. The number of ticks per second is unimportant as long as the imaginary clock ticks 100 times per sample from a selected channel. For illustration purposes, the imaginary clock ticks at approximately 120,000 ticks per second. This is because the RDU 100 samples two channels in tandem. Thus, either one of the channels is only sampled at a rate of 1200 samples/second. (1200 samples/second * 100 ticks/sample = 120,000 ticks/second).

Each sample point of raw data from a single channel is assigned a "sample time" corresponding to the elapsed ticks of the imaginary clock referenced from the first raw sample which has a sample time equal zero.

Once the data points are collected and have corresponding sample time (expressed in ticks of the imaginary clock), the RDU 100 determines the cycle time of the sine wave sampled from each channel, expressed in ticks of the imaginary clock. In order to find the cycle time, the RDU 100 searches for a starting point for the cycle time among the first few sample points. The starting point for the cycle is taken as the first sample point with a value which falls between two smaller points on one side of the sample point and two larger points on the other side. (Whether the slope of the sine wave is positive or negative at the selected point is noted for later use). This assures that the starting point will not be too near either a maximum or a minimum of the sine wave. The starting sample point is marked with "time mark 0."

Next, the RDU 100 scans forward through the samples to identify sample points equivalent to the starting point. For instance, if the sine wave magnitude was increasing at the starting point, then equivalent sample points are all points which are preceded by a point with a smaller value than the starting point, followed immediately by a point that is equal to or larger than the starting point. If the value of the second point is exactly equal to the value of the starting point, then this point provides a sample point for a cycle-time "time mark n" (e.g., the first occurrence receives a "time mark 1," the second a "time mark 2," etc). When the second sample point is not exactly equal to the value of the start point (time mark 0), then the RDU 100 interpolates between the first sample point smaller than the starting point and the second sample point larger than the starting point to obtain a sample point with a value exactly equal to the starting point. Then the time for the interpolated sample is recorded as time mark n.

The difference in time between each successive pair of time marks provides individual estimates of the cycle times for each cycle of the sine wave for the corresponding channel of the A/D converter 150. The cycle times between each time mark are then averaged (referred to as "cycle-time" for further discussion herein). As a safeguard against spurious noise, the individual cycle time estimates are compared to cycle-time (the average), and any sample that differs more than five percent is discarded as invalid. Then, the RDU 100 calculates a new average cycle-time, excluding the discarded individual cycle time estimates. This contributes to maintaining the accuracy in the system Once the cycle-time is determined, the RDU 100 transforms the raw data into a distribution with exactly 'S' (a whole number) samples per cycle. Dividing cycle-time by S provides the number of ticks, 'I', which elapse between successive transformed sample points.

The first sample point is defined as "sample time 0." The second sample point is a transformed sample point with a sample time of I (integer multiple of cycle-time). If a raw sample has a sample time exactly equal to I, then this raw sample point is used, otherwise the RDU 100 interpolates to obtain a sample point corresponding to sample time I. This process is repeated for sample times 2I, 3I, . . ., SI. The end result is a transformed sample distribution which contains samples spaced at appropriate intervals to represent exactly a whole number of cycles, each with S sample points per cycle. This transformed distribution provides enhanced accuracy for the data sampled in order to maintain the 1% repeatable accuracy desirable in the present system.

Figure 5B:
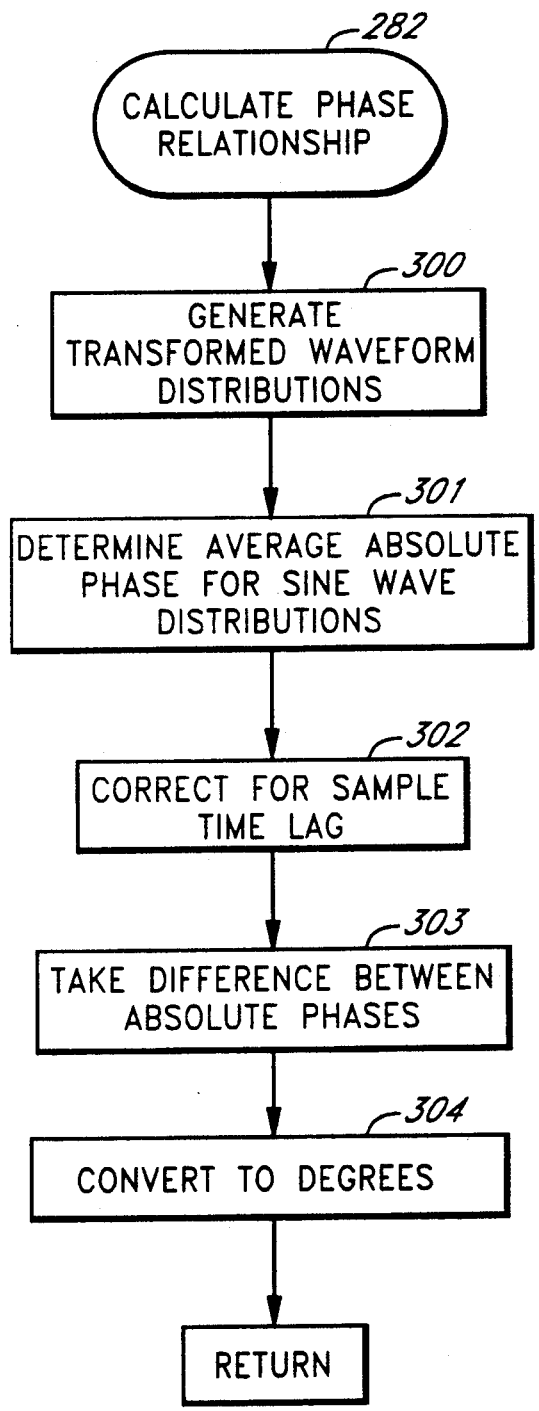

Absolute Phase Determination. The absolute phase for the sine wave is then determined as described below and represented in action blocks 301 (FIG. 5B).

To determine the absolute phase of a sampled sine wave, the RDU 100 first calculates the midline of the sine wave. The midline is found by calculating the mean of the transformed sample distribution. (The mean will provide a more accurate midline of the sine wave if the distribution is a whole number of cycles as provided by the transformed distribution). Once the midline of the sine wave is determined, the RDU 100 compares the individual sample points to the midline. Whenever, two successive samples are found where one sample is smaller than the midline, followed immediately by a sample point exactly equal to the midline, the sample time of the point equal to the midline is taken as the start of a new cycle. If the second point is greater than the midline, then a sample point between the two points is interpolated to estimate a point equal to the midline. The starting time for each new cycle, referred to as that cycle's "phase-zero-time," is determined in ticks of the imaginary clock in reference to the first sample taken.

The number of ticks between phase-zero-times for each successive cycle provides another estimate for cycle-time as defined above. If any of the individual differences between phase-zero-times for successive cycles differ from cycle-time by more than five percent, the entire distribution is discarded as invalid.

If the distribution is not invalid, the phase-zero-time for each cycle is divided, with an integer division operation, by the number of ticks per cycle (cycle-time). The remainder of the division operations are averaged to obtain an average estimate of the absolute phase of the sine wave referenced from the instant of taking the first sample.

Discarding the invalid distributions and averaging the division operations again contributes to maintaining the 1% accuracy desirable in the present system.

Relative Phase Determination. In the present embodiment, the relative phase between samples from two channels accepting data from the same phase of the power line is next determined as represented in action blocks 302, 303 and 304 (FIG. 5B). Because the samples from the channels come 50 ticks apart, one sample distribution is corrected for this offset as represented in action block 302. This correction results in the transformed distributions absolute phase being synchronized. The current is generally sampled after the voltage. Thus, 50 ticks are subtracted from the absolute phase of the current distribution. This provides an absolute phase estimate for the current distribution at the same instant when the first voltage sample was taken. If subtracting 50 ticks results in a negative number, indicating that the current sine wave has started a new cycle sometime in the 50-tick interval, then the cycle-time for the current wave is added to the negative absolute phase value. This results in a value of ticks after the start of the previous cycle.

The RDU 100 determines the relative phase by subtracting the absolute phase of the voltage from the absolute phase of the current, as represented in action block 303. If this value is negative, then cycle-time is added to the negative value.

The RDU 100 also converts the relative phase (now expressed in ticks) into degrees, as represented in action block 304. Because the ticks per cycle (cycle-time) is known, the equations is as follows: relative phase in degrees=

$$\frac{phase\ (ticks)}{ticks\ per\ cycle} \times degrees\ per\ cycle(360)$$

A selected constant, depending on the type of power line and the phase monitored, is added to the result to obtain phase readings which indicate by how many degrees the current sine wave lags the voltage sine wave. The appropriate constants are provided in Table 2 below. The value obtained is also corrected by adding any configuration offsets downloaded from the RTU 104 to the RDU 100 during configuration operations as described above.

TABLE 2

| DESCRIPTION | A PHASE | B PHASE | C PHASE |
|---|---|---|---|
| 3 PHASE, CW & CCW, P-N | 0 | 0 | 0 |
| 3 PHASE, CW, P-P | 30 | 30 | 30 |
| 3 PHASE, CCW, P-P | 330 | 330 | 330 |
| 1 PHASE, CW, P-N | 0 | 120 | 330 |
| 1 PHASE, CW, P-P | 30 | 150 | 270 |
| 1 PHASE, CCW, P-N | 0 | 240 | 120 |
| 1 PHASE, CCW P-P | 330 | 210 | 90 |

CW = ABC clockwise; CCW = ABC counterclockwise
P-N = phase-to-neutral; P-P = phase-to-phase Computing Unscaled Root Mean Squared Valued The RDU 100, having read the digitized values of the low-voltage sense signals and the digitized values of signals representing current from the clamp-on CTs 140 from the A/D converter 150, and having determined the relative phase angle between the voltage and current of the transformed synchronized distributions, calculates values corresponding to watts (W), volt-amperes (VA), volt-amperes-reactive (VAR) and the power factor (PF), as represented in action block 284. If an RDU 100 is monitoring a three-phase power equipment line, then it also calculates three-phase power and the neutral current, as represented in action block 286 (FIG. 5A).

The first step in these calculations is to find the root mean square (RMS) values of the voltage and current sine waves as represented in action block 283. The computationally efficient method of calculating the RMS values is to sum the square of each sample value and divide by the number of samples, subtract the square of the sample mean, and take the square root as follows:

$$RMS = \sqrt{\frac{\sum\limits_{1}^{n} S^2}{n} - \left[\frac{\sum\limits_{1}^{n} S}{n}\right]^2}$$

Where  S  = Sample value
       n  = number of samples

This provide RMS values for the digitized representations of the sampled sine waves.

Calibration and Scaling of the RMS values

However, because the voltage sense signals, and the signals from the clamp-on CTs 140 are scaled down substantially from actual line voltages and currents, and because electronics and inaccuracies in the system introduce bias, each RDU 100 utilizes scaling and calibration information to scale the voltage and current calculations to represent actual substation power line values.

The calibration to eliminate system bias introduced into the data by electronics and error is compensated by connecting precise DC analog signals to two of the A/D converter 150 channels. These signals are carried on the DC CAL.0 signal line 151 and the DC CAL.1 signal line 153 as depicted in FIG. 2. One channel is set to a level representing the 0-volt value by connecting the DC CAL.0 input signal line 151 to ground. The other channel is set to a level representing half the maximum possible line value. In a preferred embodiment, a calibration circuit suitable for setting the half level reference is a Motorolla MC-1403U. However, other calibration circuits are also suitable as well known in the art. The calibration is further enhanced to prevent the possibility of a spike during a calibration value sample by calculating the mean of a series of calibration samples. The calibration factor (CF) is then determined by the following equation:

$$CF = (RHS - RO)/(CHS - C)$$

where:
- RHS = raw scale sample
- RO = raw minimum sample
- CHS = mean half scale value
- CO = mean minimum sample value Once the CSF is determined, the raw RMS values are multiplied by this calibration factor to correct for bias in the system.

However, the raw RMS values still do not represent physical values for amperes or volts. Therefore, a respective scaling factor is applied to the voltage and amperes calibrated RMS values. In the present embodiment, because the current ranges in the protection circuit from 0-5 amps, the scaling factor for current is 5.000 (i.e., the RMS current value is scaled to an integer value ranging from 0-5000, where 5000 represents 5.0 amps). Because the voltages provided to the RTU on signal lines 270 generally range from 0-150 volts in the present embodiment, the voltage scaling factor is 150.00 (i.e., the RMS voltages are scaled to an integer value ranging from 0-15000, where 15000 represents 150.00 volts).

Computing Watts, Vars, and Power Factor

After the sample data is calibrated and scaled, the RDU 100 calculates volt-amps by multiplying the RMS voltage by the RMS current. The watts and vars are computed by multiplying volt amps by the cosine or the sine of the relative phase angle respectively. The power factor is computed as the cosine of the relative phase angle between the current and voltage. Power factor is expressed as an integer value in the range of +/−10000, where 10000 represents 1.0000. These calculations are represented in action block 284.

If the system is monitoring a three-phase equipment line (represented in decision block 285), the three-phase values are also calculated, as represented in action block 286, as follows:
- Three phase volts = average of volts for all three phases.
- Three-phase amps = sum of amps for the three individual phases
- Three-phase volt amps = sum of volt amps for the three individual phases
- Three-phase watts = sum of watts for the three individual phases.
- Three-phase vars = sum of vars for the three individual phases.

These calculations are well understood in the art.

The RDUs 100 store the data acquired and the calculation results in its memory 160, as represented in action block 287.

Once the RDUs 100 have stored the data acquired, the RDUs determine whether any control functions are necessary, as represented in decision block 288. A control function would normally be carried out utilizing the digital I/O interface 190 of the RDU 100. In one embodiment, the digital interface 190 has 12 digital inputs and 12 digital outputs. An exemplary use for the digital inputs is to monitor circuit breaker status in the substation. Two digital inputs can be used for each circuit breaker. One digital input to indicate that a selected circuit breaker (not shown) is open and one input to indicate that the selected circuit breaker is closed. The digital outputs of the digital interface 190 can be used to perform other control functions as may be needed throughout the substation. The RTU 104 has similar capabilities.

If a control function is necessary, then the RDU 100 will perform that control function, as represented in action block 289. If no control functions are currently requesting service from the RDU 100, the RDU 100 executes any serial communications commands, as represented in action block 290, if the RTU 104 has requested information from the RDU 100.

Once all of these functions are carried out by the RDU 100, the RDU 100 will wait until the 3-second sampling period has expired, as represented in decision block 291. As soon as the 3-second sampling period has expired, the RDU 100 will return to action block 281 and collect another 0.25 seconds of data and repeat the sequence of data acquisition, analysis and executing other operations.

Interrupt Driven Tasks

The data collection and analysis routine just described occurs under RDU 100 control every 3 seconds in the present embodiment. The RDU 100 also accepts interrupt-driven tasks which occur asynchronously to the main tasking as explained above.

For instance, the CPU clock is configured to interrupt the CPU 200 every 100 milliseconds. Upon this interrupt, the time of day, day of week and date are read from the real time clock/calendar and stored into the main memory of the RDU 100. The serial I/O interface 172 provides another interrupt. Whenever the RDU 100 receives or transmits a character via its serial I/O interface 172, an interrupt is generated. This interrupt causes the next character to be sent or stored in memory 160 by the CPU 200. At the end of the transmission or reception of data, the serial interface sets a flag for the CPU 200 indicating that the transmit buffer has been sent or that a receive buffer is available. This serial interface protocol is well understood in the art.

Communications Capability

Advantageously, the RDU 100 communicates with the RTU 104 via a serial communications multidrop interface well understood in the art. Data transfers are carried out using eight-bit protocol as well understood in the art. All RDUs 100 connected to one RTU 104 communicate over this local area network (LAN) where communications are multidropped over the same wire. Thus, the RTU 104 transmits and receives, and all the RDUs 100 transmit and receive over one pair of wires. The resulting system is a peer-to-peer communications structure as well understood in the art. The RDUs 100 collect and analyze large amounts of data as explained above, which they transmit to the RTU 104 upon request.

In the present embodiment, communications between the RDUs 100 and the RTU 104, and between the RTU 104 and the host 110 advantageously adhere to the NetCom protocol proprietary to the Metricom Corporation. However, other protocols well understood in the art for serial communications in a LAN are also appropriate for use with the system and do not detract from the subject matter regarded as invention.

RTU Specific Firmware

Figure 6:
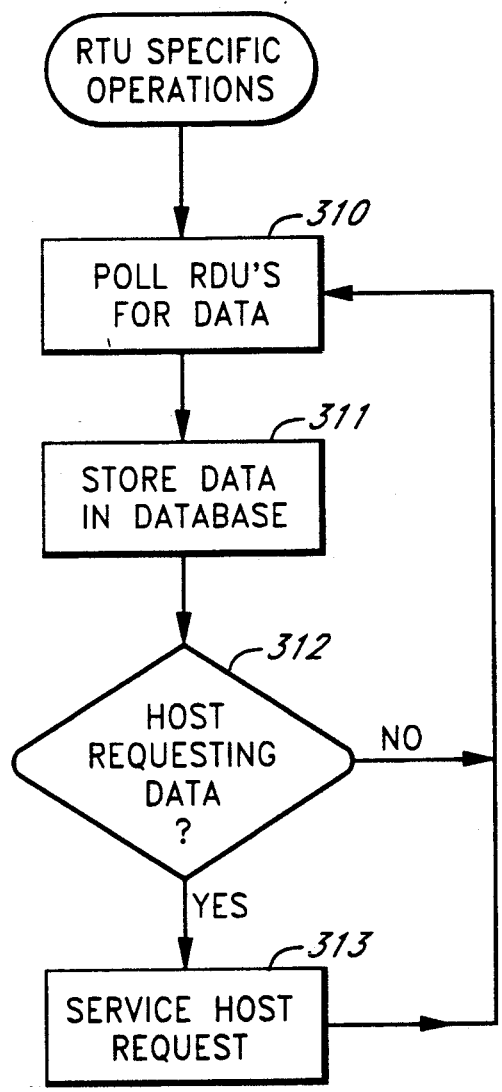
FIG. 6 is an exemplary flow chart for firmware of the RTU.

As depicted in the flow chart of FIG. 6, the RTU 104 is programmed to perform a number of functions that the RDUs 100 do not generally perform. The RTU 104 polls the RDUs 100, as represented in action block 310, to obtain the data collected and processed by the RDUs 100 as explained above, and stores this data for each RDU 100 in a database, as represented in action block 311. The RTU 104 provides this data to the host 110 upon request via the communications link 106 (FIG. 1), as represented in decision block 312 and action block 313.

Remote RDU Configuration

The present invention can also be implemented without an RTU 104 at each substation location, as illustrated in FIGS. 7 and 7A. The RDUs 100-100B still form a daisy chained network, and a local step-down power converter/supply 350 accepts the sense voltages (e.g. 120 VAC) from the power equipment on lines 272 and converts these to low voltage (e.g. six-volt) AC sense voltages accepted by RDUs 100. The local power supply 350 accepts station power on line 352 and provides the 24-volt DC power for the RDU 100 power supply 130 (FIG. 2). The data collected and calculated by the RDUs 100, 100A and 100B (FIG. 7A) is transmitted to a remote RTU 104 via a radio transmitter 354, or other communications link. The RTU 104 then receives the signals from the remote RDUs 100 via the radio 356. The RTU 104 may also monitor other RDU 100 devices locally, as shown in FIG. 7 as RDU 100C and 100D.

Although the preferred embodiment of the present invention has been described and illustrated above, those skilled in the art will appreciate that various changes and modifications to the present invention do not depart from the spirit of the invention. Accordingly, the scope of the present invention is limited only by the scope of the following appended claims.

What is claimed is:

1. A substation monitoring system wherein the substation distributes power through power equipment carrying a voltage waveform and a current waveform, wherein the power equipment also has associated protection circuits carrying a current waveform which is stepped down from, but proportional to, the current waveform in the power equipment, said system comprising:

at least one system controller;

a power converter which steps down said power equipment voltage waveform;

a high-accuracy, split-core current transformer permanently, yet detachably mounted on one leg of said protection circuit, said current transformer providing a stepped down current waveform, stepped down from, but proportional to, the current waveform in the power equipment;

a sampler which accepts the stepped down current waveform from said current transformer and converts the stepped down current waveform into a digital representation of said current waveform, and which accepts the stepped-down power equipment voltage waveform and converts the voltage waveform to a digital representation of said voltage waveform;

at least one microcontroller based data unit in communication with said system controller, wherein said data unit is coupled to the sampler and accepts the digital representations of the voltage and current waveforms from said sampler and determines from the digital representations of the voltage and current waveforms, a relative phase angle between the sampled current waveform and the sampled voltage waveform, and wherein the data unit further utilizes the digital representations of the voltage and current waveforms to calculate the power, power factor, and volt amperes reactive, distributed by said power equipment; and a communications link which sends said calculations to a remote computer.

2. The substation monitoring system of claim 1, wherein current in said protection circuit is in the range of 0-5 Amps, and the stepped down current waveform from said split-core current transformer is in the range of 0-0.5 mA.

3. The substation monitoring system of claim 2, wherein the split-core current transformer is calibrated upon installation such that is has a repeatable accuracy of 1% or better in the current range during system operation.

4. A method of monitoring substation power equipment carrying a voltage waveform and a current waveform, wherein the power equipment also has associated protection circuits carrying a current waveform which is stepped down from, but proportional to, the current waveform in said power equipment, said method comprising:

providing at least one system controller;

providing at least one data acquisition controller in communication with said system controller;

stepping down said power equipment voltage waveform;

permanently, yet detachably mounted a split-core current transformer on one leg of said protection circuit, said current transformer providing a current waveform, stepped down from, but proportional to, the current waveform in said power equipment;

sampling the current waveform provided by said current transformer and converting the current waveform into a digital representation of the current waveform for further processing by said system controller and said data acquisition controller;

sampling said stepped-down power equipment voltage waveform and converting said voltage waveform to a digital representation of the voltage waveform; and determining a relative phase angle between the sampled current waveform and the sampled voltage waveform by utilizing the digital representation of the voltage and current waveforms;

calculating the power, power factor and volt amperes reactive distributed by said power equipment by using the sampled digital representations of the voltage and current waveforms; and transmitting the calculations to a remote computer.

5. A method of monitoring substation power equipment carrying a voltage waveform and a current waveform, wherein the power equipment also has associated protection circuits carrying a current waveform which is stepped down from, but proportional to, the current waveform in said power equipment, wherein the voltage and current waveforms are alternating current sine waves said method comprising:

providing a at least one system controller;

providing at least one intelligent data unit in communication with said system controller;

stepping down the power equipment voltage waveform;

permanently, yet detachably mounting a high-accuracy, split-core current transformer on at leas one leg of said protection circuit, said current transformer providing a current waveform stepped down from, but proportional to, the current waveform in said power equipment;

sampling the current waveform provided by said current transformer and converting the current waveform into a digital representation of the current waveform for further processing by said data unit and said system controller;

sampling said stepped-down power equipment voltage waveform and converting said voltage waveform to a digital representation of the power equipment voltage waveform; and determining a relative phase angle between the sampled current waveform and the sampled voltage waveform sine waves by utilizing the digital representations of the voltage and current waveforms.

6. The method of monitoring of claim 5, wherein said step of detachably mounting comprises the steps of:

removing a detachable base plate of said split-core current transformer;

positioning said one leg of said protection circuit within the split-core current transformer; and re-attaching the detachable base plate.

7. The method of monitoring of claim 5, wherein said system controller communicates with a remote computer.

8. The method of monitoring of claim 5, further comprising the steps of:

calculating the power, volt amperes, power factor, and volt amperes reactive, associated with said power equipment by utilizing the digital representations of the voltage and current waveforms; and transmitting said calculations to a remote computer.

9. A method of monitoring substation power equipment carrying a voltage and a current in the form of sine waves, wherein the power equipment also has associated protection circuits carrying a current in the form of sine waves which is stepped down from, but proportional to, the current flowing in said power equipment, said method comprising the steps of:

stepping down the power equipment voltage;

stepping down the protection circuit current with a split-core current transformer by detachably mounting the split-core current transformer on a leg of the protection circuit, such that a current provided from the split-core transformer is proportional to the current flowing in the power equipment;

sampling with a sampler the current provided by said current transformer and converting the current into a digital representation with a single converter, wherein the sampling and converting of the current provides a first plurality of raw sample points representative of the current sine waves in said power equipment;

sampling with said sampler said stepped-down power equipment voltage and converting said voltage to a digital representation of the voltage with said single converter, wherein the sampling and converting of the voltage provides a second plurality of raw sample points representative of the voltage sine waves in said power equipment said second plurality not being synchronized in time with the first plurality of raw sample points;

assigning corresponding time clicks for each of the first plurality and the second plurality of raw sample points; and transforming the first and the second plurality of raw sample points into a first transformed synchronized distribution and a second transformed synchronized distribution, wherein the first and second transformed distributions comprises corresponding synchronized sample points which form a representation of the voltage and current sine waves of said power equipment.

10. The method of monitoring power equipment of claim 9, the method further comprising the steps of:

calculating a first mean of the first transformed distribution and a second means of the second transformed distribution;

determining the time clicks for points in the first transformed distribution which equal the first mean;

determining the time clicks for points in the second transformed distribution which equal the second mean;

averaging the difference in time clicks between consecutive points in the first transformed distribution which equal the first mean to determine an average cycle time for said first transformed distribution; and averaging the difference in time clicks between consecutive points in the second transformed distribution which equal the second mean to determine an average cycle time for said second transformed distribution.

11. The method of monitoring substation power of claim 10, the method further comprising the step of:

calculating the difference between the average cycle time for said first distribution and the average cycle time for said second distribution to determine a relative phase time between said first and said second transformed distributions.

12. The method of monitoring substation power of claim 11, the method further comprising the steps of:

calculating the root means squared voltage and the root means squared current for said power equipment from the first and second transformed distributions; and calculating a power factor for said power equipment corresponding to the relative phase between the first and the second transformed distributions.

13. The method of monitoring substation power of claim 9, the method further comprising the steps of:

determining an average cycle time for said first transformed distribution;

determining an average cycle time for said second transformed distribution; and determining a relative phase time between said first and said second transformed distributions.

14. The method of monitoring substation power of claim 13, the method further comprising the steps of:

calculating the root means squared voltage and the root mean squared current of the power equipment from the first and second transformed distributions; and calculating a power factor for the power equipment corresponding to the relative phase between the first and the second transformed distributions.

15. A method of monitoring substation power distributed by power equipment carrying a voltage and a current in the form of sine waves, wherein the power equipment also has associated protection circuits carrying a current which is stepped down from, but proportional to, the current flowing in said power equipment, said method comprising the steps of:
   stepping down the power equipment voltage;
   stepping down the protection circuit current with a split-core current transformer by detachably mounting the split-core current transformer on a leg of said protection circuit, such that a current provided from the split-core transformer is proportional to the current flowing in the power equipment;
   sampling a representation of the current provided by said current transformer and converting said representation into digital form with a converter, wherein the sampling and converting of the representation of the current provides a first plurality of raw sample points representative of the current flowing in said power equipment;
   sampling the stepped-down power equipment voltage and converting said voltage to digital form with said converter, wherein the sampling and converting of the voltage provides a second plurality of raw sample points representative of the voltage in said power equipment, said first plurality of raw sample points not being synchronized in time with said second plurality of raw sample points; and
   transforming the first and the second plurality of raw sample points into a first transformed synchronized distribution and a second transformed synchronized distribution wherein the first transformed distribution comprises a first plurality of data points and the second transformed distribution comprises a second plurality of data points, said first plurality of data points being synchronized in time to the second plurality of data points.

16. A monitoring system for use with power equipment carrying related voltage and current sine waves, the system comprising:
   at least one split-core current transformer permanently, yet detachably mounted on one leg of a protection circuit for the power equipment;
   a sampler which obtains alternate raw sample points of the related voltage and current sine waves and converts the raw sample points to digital form; and
   data acquisition equipment which accepts the digital raw sample points from the sampler, transforms the digital raw sample points into transformed synchronized distributions having a plurality of synchronized digital data points, wherein said transformed distributions provide digital representations of the related voltage and current sine waves;
   said data acquisition equipment comprising a microcontroller based data unit in communication with the sampler, wherein said data unit is coupled to the sampler and accepts the digital representations of the voltage and current sine waves, wherein the data unit determines a relative phase angle between the related voltage and current sine waves by comparing the digital representations of the related voltage and current sine waves.

17. A substation monitoring system wherein the substation distributes power through power equipment carrying a voltage waveform and a current waveform, wherein the power equipment also has associated protection circuits carrying a current waveform which is stepped down from, but proportional to, the current waveform in the power equipment, said system comprising:
   a power converter which steps down said power equipment voltage waveform;
   a split-core current transformer permanently, yet detachably mounted on one leg of said protection circuit, said current transformer providing a stepped down current waveform, stepped down from, but proportional to, the current waveform in the power equipment, said stepped down current waveform being in the range of 0–0.5 mA, said split-core current transformer further being calibrated within the substation monitoring system to have a repeatable accuracy of 1% or better in the 0–0.5 mA stepped down current waveform range during system operation;
   a sampler which accepts the stepped down current waveform from said current transformer and converts the stepped down current waveform into a digital representation of said current waveform, and said sampler accepting the stepped down power equipment voltage waveform and converting the voltage waveform to a digital representation of said voltage waveform;
   at least one microcontroller based data unit coupled to the sampler, said data unit accepting the digital representations of the voltage and current waveforms from said sampler and determining from the digital representations of the voltage and current waveforms, a relative phase angle between the sampled current waveform and the sampled voltage waveform, and wherein the data unit further utilizes the digital representations of the voltage and current waveforms to calculate the power, power factor, and volt amperes reactive, distributed by said power equipment; and
   a communications link which sends said calculations to a remote computer.

18. A substation monitoring system wherein the substation distributes power through power equipment carrying a voltage waveform and a current waveform, wherein the power equipment also has associated protection circuits carrying a current waveform which is stepped down from, but proportional to, the current waveform in the power equipment, said system comprising:
   a power converter which steps down said power equipment voltage waveform;
   a split-core current transformer detachably mounted on one leg of said protection circuit, said current transformer providing a stepped down current waveform, stepped down from, but proportional to, the current waveform in the power equipment;
   a sampler which accepts the stepped down current waveform from said current transformer and converts the stepped down current waveform into a digital representation of said current waveform, said sampler further accepting the stepped down power equipment voltage waveform and converting the voltage waveform to a digital representation of said voltage waveform; and at least one microcontroller based data unit coupled to the sampler, said data unit accepting the digital representations of the voltage and current waveforms from said sampler and determining from the digital representations of the voltage and current waveforms, a relative phase angle between the sampled current waveform and the sampled voltage waveform, and wherein the data unit further utilizes the digital representations of the voltage and current waveforms to calculate the power, power factor, and volt amperes reactive, distributed by said power equipment.

* * * * *

UNITED STATES PATENT AND TRADEMARK OFFICE
CERTIFICATE OF CORRECTION

PATENT NO. : 5,179,376
DATED : January 12, 1993
INVENTOR(S) : Laqrence A. Pomatto It is certified that error appears in the above-identified patent and that said Letters Patent is hereby corrected as shown below:

Column 18, line 23, change "that is has" to -- that it has--.

Column 18, line 38, change "detachably mounted" to -- detachably mounting--.

Column 19, line 9, change "at leas" to --at least--.

Column 20, line 21, change "a second means" to --a second mean--.

Column 20, lines 48-49, change "the root means squared voltage and the root means" to --the root mean squared voltage and the root mean--.

Column 20, line 65, change "the root means" to -- the root mean--.

Signed and Sealed this

Eleventh Day of January, 1994

Attest:

BRUCE LEHMAN

Attesting Officer

Commissioner of Patents and Trademarks